(12) United States Patent
Becher

(10) Patent No.: US 10,638,729 B2
(45) Date of Patent: May 5, 2020

(54) FISHERMEN'S ISLAND FOR GROWING 10,000 TONS OF FISH AND SEAFOOD IN WATER-FILLED RING-TUBE FISHERY

(71) Applicant: Yona Becher, Budd Lake, NJ (US)

(72) Inventor: Yona Becher, Budd Lake, NJ (US)

( * ) Notice: Subject to any disclaimer, the term of this patent is extended or adjusted under 35 U.S.C. 154(b) by 0 days.

(21) Appl. No.: 16/602,470

(22) Filed: Oct. 11, 2019

(65) Prior Publication Data

US 2020/0107525 A1    Apr. 9, 2020

(51) Int. Cl.
*A01K 61/10*      (2017.01)
*A01K 61/75*      (2017.01)
*A01K 61/65*      (2017.01)

(52) U.S. Cl.
CPC .............. *A01K 61/10* (2017.01); *A01K 61/65* (2017.01); *A01K 61/75* (2017.01)

(58) Field of Classification Search
CPC ........ A01K 61/10; A01K 61/60; A01K 61/75; A01K 61/70; A01K 61/65
USPC .......................................................... 119/215
See application file for complete search history.

(56) References Cited

U.S. PATENT DOCUMENTS

| | | | | | |
|---|---|---|---|---|---|
| D271,096 | S | * | 10/1983 | Nurmi ........................... | D12/316 |
| 5,172,649 | A | * | 12/1992 | Bourgeois .............. | A01K 61/60 |
| | | | | | 119/223 |
| 5,438,958 | A | * | 8/1995 | Ericsson ................ | A01K 61/54 |
| | | | | | 119/223 |
| 5,970,917 | A | * | 10/1999 | Keith, Jr. ............... | A01K 61/70 |
| | | | | | 119/223 |
| 2006/0162667 | A1 | * | 7/2006 | Papadoyianis ......... | A01K 61/60 |
| | | | | | 119/223 |
| 2012/0167829 | A1 | * | 7/2012 | Madsen .................. | A01K 61/60 |
| | | | | | 119/223 |
| 2015/0359206 | A1 | * | 12/2015 | Naess ..................... | A01K 63/04 |
| | | | | | 119/215 |
| 2019/0029231 | A1 | * | 1/2019 | Becher ................... | A01K 61/78 |

* cited by examiner

*Primary Examiner* — Magdalena Topolski
*Assistant Examiner* — William L Gmoser

(57) ABSTRACT

A floating Fishermen's island for growing 10,000 tons of fish and seafood within multiple water-filled ring-tube fishery, including auxiliary fish growing pools and recreation boating, fishing and water sports amenities. The Island comprising equally spaced radial Island member array made of molded plastic emerging from a floating Island center with cylindrical ends pivoted to island center arms-ends and to island outer boat docking segments. Vertical poles extending island radial members supporting walk-over-water fishermen's deck segments above water-filled ring-tube fishery for fishing from fish pools underneath. Connection cable connects each island radial member underneath the ring-tubes, with cable to anchor the island to seabed. A 'walk over water' elevated deck connected with bridges over poles multiple radial island docking for large service boats, sail boats and speed boats comprising multiple radial island boat docking segments, service boat docking segments allow loading and unloading reef for multiple service, sail and motorboats.

1 Claim, 10 Drawing Sheets

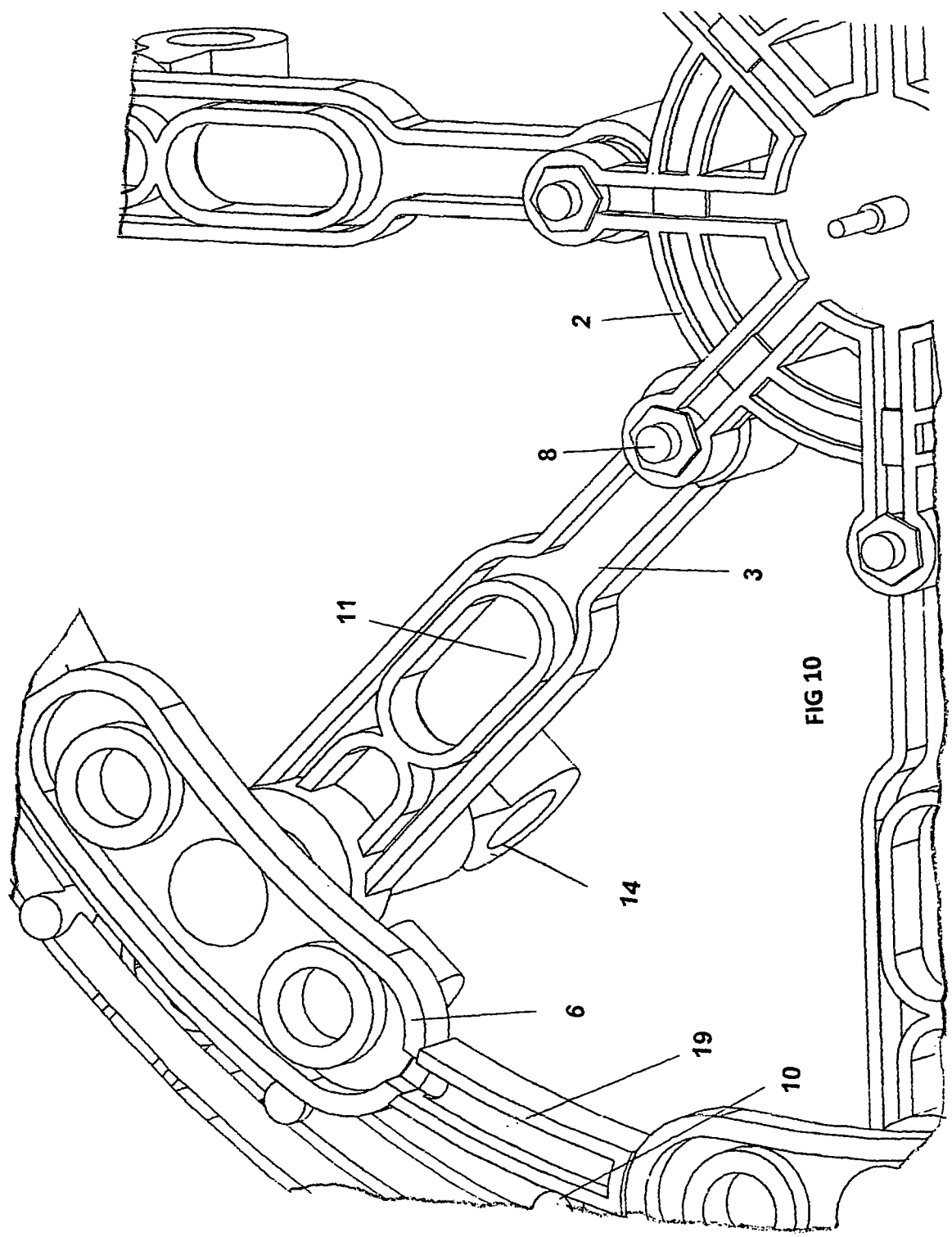

FISHERMEN'S ISLAND FOR GROWING 10,000 TONS OF FISH AND SEAFOOD IN WATER-FILLED RING-TUBE FISHERY

BACKGROUND OF THE INVENTION

(A) Field of the Invention

Oceans and seas cover more than 70% of the planet, but most of the food currently feeding more than 7 billion people of the planet is provided mostly from the agriculture on less than third of the available land, while many people on the globe are poor and hungry. Oceans grow millions of types of fish and sea food that could provide healthy food to billions of people. Basic land-agriculture has minimum basic requirements including good-quality land, reasonable mild weather and in addition enough irrigation water. In fact, more than 70% of the land on the planet cannot be used for agriculture, and therefore there is urgent need to find additional sources for healthy food in the oceans and seas over the glove where land-agriculture food is not available. For thousands of years, people used small fishing boats as well as larger sail boats to fish in oceans and seas all over the world. Nevertheless, so far, the people of the planet could not get enough fish and seafood from the oceans due to danger involved in fishing in deep waters and due to technical difficulty in catching different fish types at various depths of water around globe. During recent thousands of years of history of the world, countless boats of various sizes sank in the oceans due to rough seas, with many fishermen losing their lives.

Evidently, fresh fish and seafood are becoming main healthy food in America and around the world. With international food business of more than 250 billion dollars annually spent on consuming fish and seafood in America alone, there is major demand for fresh fish rather than frozen fish imported from thousands of miles away. Undoubtedly, fishing of variety of types of fish and sea food in the seas and oceans of the world is now limited due to the disappearance of many types of fish due to over-fishing or due to predators killing other types of fish. Therefore, so-called wild fishing in oceans cannot provide enough fresh fish, seafood of many types at reasonable price to more than 330 million Americans and to more than 7 billion people of the world.

During hundreds of years of uncontrolled fishing in seas and oceans around the world, many types of fish and seafood did not survive and disappeared due to over-fishing or by other fish types. Growing fish in sea farms such as open fishponds located in foreign countries hundreds or thousands of miles away from America created health problems too many types of fish. In addition, transferring live fish and seafood over thousands of miles to America and keeping them alive in a container in supermarket is very expensive. America, currently imports more than 85 percent of its fish and seafood, with more than 10 billion pounds of shrimps, half of which comes from aquaculture farming. More than 40% of US consumption of frozen fish and seafood which comes from wild fishing at international waters far away from America's shores. These conditions are the reason to the high price of common fresh fish such as Salmon and Tilapia in typical supermarket or restaurant in America, making it very expensive, exceeding $10 per pound, thus making it exclusive food for the high-income population and mostly unaffordable for the poor and middle class. This means that healthy sea food is not readily available to many tens of millions of hard-working Americans.

PRIOR ART SUMMARY

U.S. Pat. No. 10,226,031 B2 to Becher define a floating closed-volume sealed-wall water-filled floatable ring-tube fishery for growing 2000 tons of fish and seafood in which they grow while being isolated from surrounding sea water.

Note: This prior art U.S. Pat. No. 10,226,031 B2 to Becher is included in the current new patent with same inventor Yona Becher.

US Patent No. US 20150150223 A1 to Robinson describe a system for circulating water of rearing space for aquatic organisms in a large volume containing of water and organisms. A water pump to pump water from intake through to create circulation of the water within the enclosure. Robinson offers a water pump for water circulation. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

US Patent No. US 20110315085 A1 to Lindgren describe a floating fish cage and holding pen made of molded structure with junctions connecting tube members with screen attachment that may be free floating, secured to a structure, or lowered to the ocean bottom and with addition of a tower for navigation and communication intended for open ocean offshore aquaculture. However, Lindgren offers floating fish cage with screen. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

US Patent No. US 20050235921 A1 to Niezrecki and Kim describe a self-deployable open ocean aquaculture cage that includes at least one elongate flexible support member having an open interior for receiving a fluid and a net that forms an enclosure capable of retaining fish. Niezrecki and Kim offer open ocean cage. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 7,587,991 B2 to Buck and Buchholz describes a floating macro algae and mussels support device made of flexible two rings with net that forms enclosure may be free floating, secured to a structure, or lowered to the ocean related to open ocean offshore aquaculture. Buck and Buchhold offer two rings with net. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 6,216,635 B1 to McRobert describes a fish pen with net made of buoyant flexible support members with net that forms enclosure and lifting device with divers controlling the fish capturing in underwater pen. Tanks which may be free floating, secured to a structure, or lowered to the ocean elated to open ocean offshore aquaculture. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. patent Ser. No. 05/970,917 A to Keith describes a marine aquaculture apparatus comprises a submersible torus-shaped enclosure having perforations holes. Structure is provided for raising and lowering the enclosure in a body of water. It is a fish pen with net made of buoyant flexible support members with net that forms enclosure. Keith offers a submersible torus-shaped enclosure having perforations holes. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 5,617,813 A to Loverich, Swanson and Goudey describes a marine aquaculture mobile pen free-floating, with mobility under currents to fish harvesting location with net-supported by ring with optional anchoring. Loverich, Swanson and Goudy offers a mobile pen free-floating under marine currents. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 5,299,530 A to Mukadam and Morgan describes a marine aquaculture apparatus comprises a submergible enclosed net fish cage comprising: a float; a fish cage. Mukadam and Morgan offer a submergible net fish cage. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 4,244,323 A to Morimura describes a marine aquaculture apparatus comprises an apparatus for floating and sinking fish breeding netted tanks. Morimura offers a floating and sinking fish breeding netted tanks. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 4,506,623 A to Roper and Herrera describes a buoyant marine storage vessel for fluids, such as oil, includes a flexible containment bag having at least a controllable inlet and outlet for fluids and a wire rope cage for the bag. Roper and Herrera offer a flexible containing bag for fluids such as oil with wire rope cage. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

US Patent No. US 20080245286 A1 to Adamo describes a floating structure for the installation of equipment such as wind turbines and solar power plants. The floating body that provides required buoyancy for the overall structure to float. Adamo offers floating structures for installation of various equipment. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

WO 2006/043116 A1 Titled: Technical, Technological and ecological Solution for Tuna Fish by Zankl Frano Improving the Towing and anchoring of an aquaculture cage with net for tuna equipment by boat. Zankl Frano offers a towing and anchoring cage. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

JP 03251131 A titled: Crawl Frame

BY Morita Tetsuo, Sakuraoka Makuto and Kozono Yasushi

Improving crawl frame design of aquaculture frame with net. Morita Tetsuo, Sakuraoka Makuto and Kozono Yasushi offer a crawl frame with net. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

JP02012231732A

Titled: Method for Recovering Middle-Layer Floating Fish Bank and recovering tool with cables.

By Swada, Masayuki and Yamagata Shohei

Method for recovering middle-layer floating fish bank and recovering tool with cables. Swada, Masayuki and Yamagata Shohei offer a method for recovering floating fish bank and recovering tool. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 9,655,347 by Troy et al. suggests open ocean fish farm. Troy et al. offer an open ocean fish farm. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 8,028,660 by Troy offers automated positioning and submersible open ocean platform. Troy offers open submersible ocean platform. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 6,520,115 by Zemach dated Nov. 19, 2002 offers support platform and structure for fish farming. Zemach offers a support platform and structure for fish farming. However, it does not define a floating island with walking-over-water fishing deck, docking boats reef anchored to seabed and containing closed-volume sealed-wall water-filled floatable ring-tube fishery in which fish and seafood grow while being isolated from surrounding sea water.

U.S. Pat. No. 8,550,022 dated Oct. 8, 2013 by Yona Becher offers straight long tube container for transferring water from flooded area which is different from the current application.

Conclusion:

None of the above prior art defines a floating island with walking-over-water fishing deck, docking boats reef anchored to seabed and containing closed-volume sealed-wall water-filled floatable ring-tube fishery in which fish and seafood grow while being isolated from surrounding sea water.

OBJECTS AND ADVANTAGES OF THE INVENTION

This invention relates to growing tens of thousand tons of quality fresh fish and seafood in floating water-filled ring-tube fishery in fishermen's Island reef anchored to seabed within miles from the coastline. The amount of fish grown within said water-filled ring tube increases linearly with the volume inside the ring-tube fishery. Therefore, the diameter of the tube and the diameter of the ring are critical in determining the number of thousands of tons of fish grown within said ring-tubes fishery at certain period. The diameter of the tube may be limited by the depth of the ocean at the location chosen close to coastline. The diameter of the ring depends on space availability further away from the shoreline. The volume of said floatable water-filled ring tube fishery and the size and diameter of the ring tubes is determined by economic considerations, distance from the coastline and initial investment needed to build the fishery and the fishermen's island that surrounds it.

The advantage of the invention includes creating new high volume 10,000 tons of fish and seafood growing within multiple transparent concentric water-filled ring-tube fishery, each with controllable floating in the sea water and anchored to the seabed, with each ring circumference exceeds 1000 meters available for the fish to swim around. In each water-filled ring-tube there are only one or more selected types of fish to prevent certain fish predators from killing and eating other types. Each fish growing water-filled ring-tube fishery provides high volume new domestic sources of fresh live fish and seafood along the Atlantic and Pacific oceans and along ocean coastlines all over America and around the world aiming at solving the lack of available supply of fresh seafood to meet the new increased demand at low cost all over the world. The new large volume fresh fish and seafood source would guarantee daily of tens of thousands of tons of fresh local supply of healthy seafood for decades to come at lower price. In addition, the invention relates to fishermen's island. A floating Fishermen's island for growing 10,000 tons of fish and seafood within multiple water-filled ring-tube fishery, including auxiliary fish growing pools and recreation boating, fishing and water sports amenities. The Island comprising equally spaced radial Island member array made of molded plastic emerging from a floating Island center with cylindrical ends pivoted to island center arms-ends and to island outer boat docking segments. Vertical poles extending island radial members supporting walk-over-water fishermen's deck segments above water-filled ring-tube fishery for fishing from fish pools underneath. Connection cable connects each island radial member underneath the ring-tubes, with cable to anchor the island to seabed. A 'walk over water' elevated deck connected with bridges over poles multiple radial island docking for large service boats, sail boats and speed boats comprising multiple radial island boat docking segments, service boat docking segments allow loading and unloading reef for multiple service, sail and motorboats.

In addition, the importance of the invention for a cleaner environment is using thousands of tons of recycled plastic moldable and floatable compounds of various types to construct the floating Fishermen's Island. With many Fishermen's islands build along beaches of Atlantic ocean and Pacific oceans, the amount of recycled plastic used accumulate to thousands of tones which is good for cleaner environment.

Another important advantage of the invention for energy saving is growing 10,000 tons of fish alongside our shoreline in Fishermen's island fisheries enables shipping fresh and live fish and seafood to the fish markets, avoiding shipping important frozen fish and seafood from other countries thousands of miles away by aircrafts and ships, therefore saving lots of energy and protecting the planet.

TABLE 1

| Figures | item numbers |
| --- | --- |
| 1 | Ring-tube Fishery |
| 2 | Island center |
| 3 | Island radial member |
| 4 | Docking reef for service boats |
| 5 | Docking reef for sailboats and speed boats |
| 6 | Walk-on-Water deck |
| 7 | Deck Supporting Pole |
| 8 | Radial Member inner end |
| 9 | Radial Member outer end |
| 10 | Ring-Tube Vertical Pipe connection |
| 11 | Fishery auxiliary pool |
| 12 | Centering Adaptor inner |
| 13 | Connection plate reef |
| 14 | Cable connection under ring-tube |
| 15 | Cable connection to Seabed |
| 16 | Connection reef hinge |
| 17 | Centering adaptor outer |
| 18 | Auxiliary reef pools |
| 19 | Walking-On-Water bridge |
| 20 | Auxiliary fish pool |

BRIEF DESCRIPTION OF THE DRAWINGS

The invention as herein described, by a way of example only, with reference to the accompanying drawings, wherein:

FIG. 10 is a detail top view embodiment of Fishermen's Island center in construction without docking reef

DETAIL DESCRIPTION OF THE DRAWINGS

Figure 1:
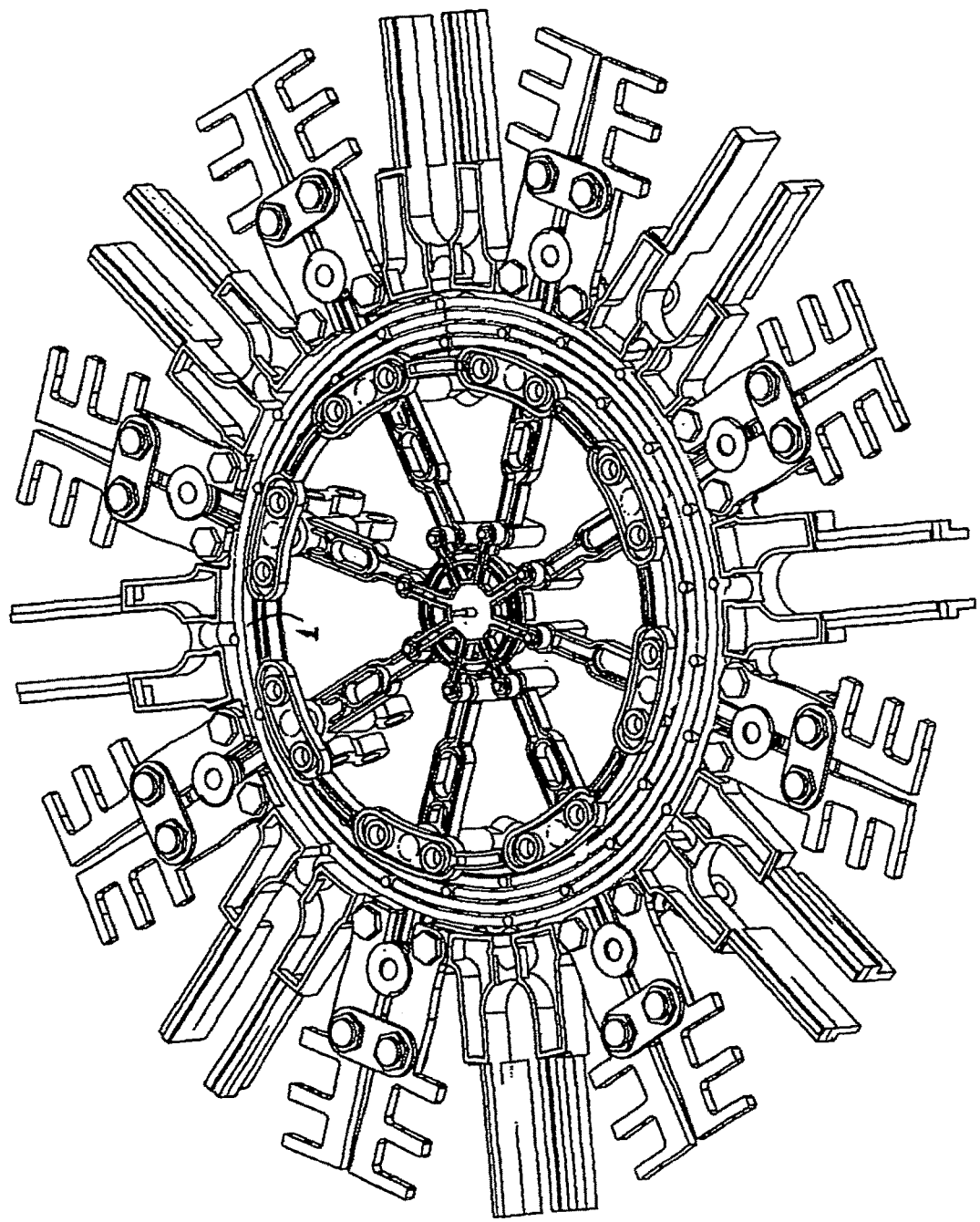
FIG. 1 is a preferred embodiment of Fishermen's Island with floating fishery water-filled ring tubes

FIG. 1 is a preferred embodiment of Fishermen's Island with floating fishery water-filled ring tubes. A floating Fishermen's island for growing 10,000 tons of fish and seafood within multiple water filled ring tube fishery 1.

The Fishermen's Island is mainly constructed and supported by eight radial Island members array 3 made of recycled moldable and floatable plastic emerging from a floating Island center 2 and floating along equally spaced radii. Each radial Island member consists internally cylindrical end 8 pivoted and secured to Island center 2, and externally cylindrical end 9 pivoted and secured to island outer docking segments. Eight Island radial members 3 are equally spaced and emerging from Island center 2, spreading outward from a common Island center to pivot and secured to the external docking reefs.

Figure 2:
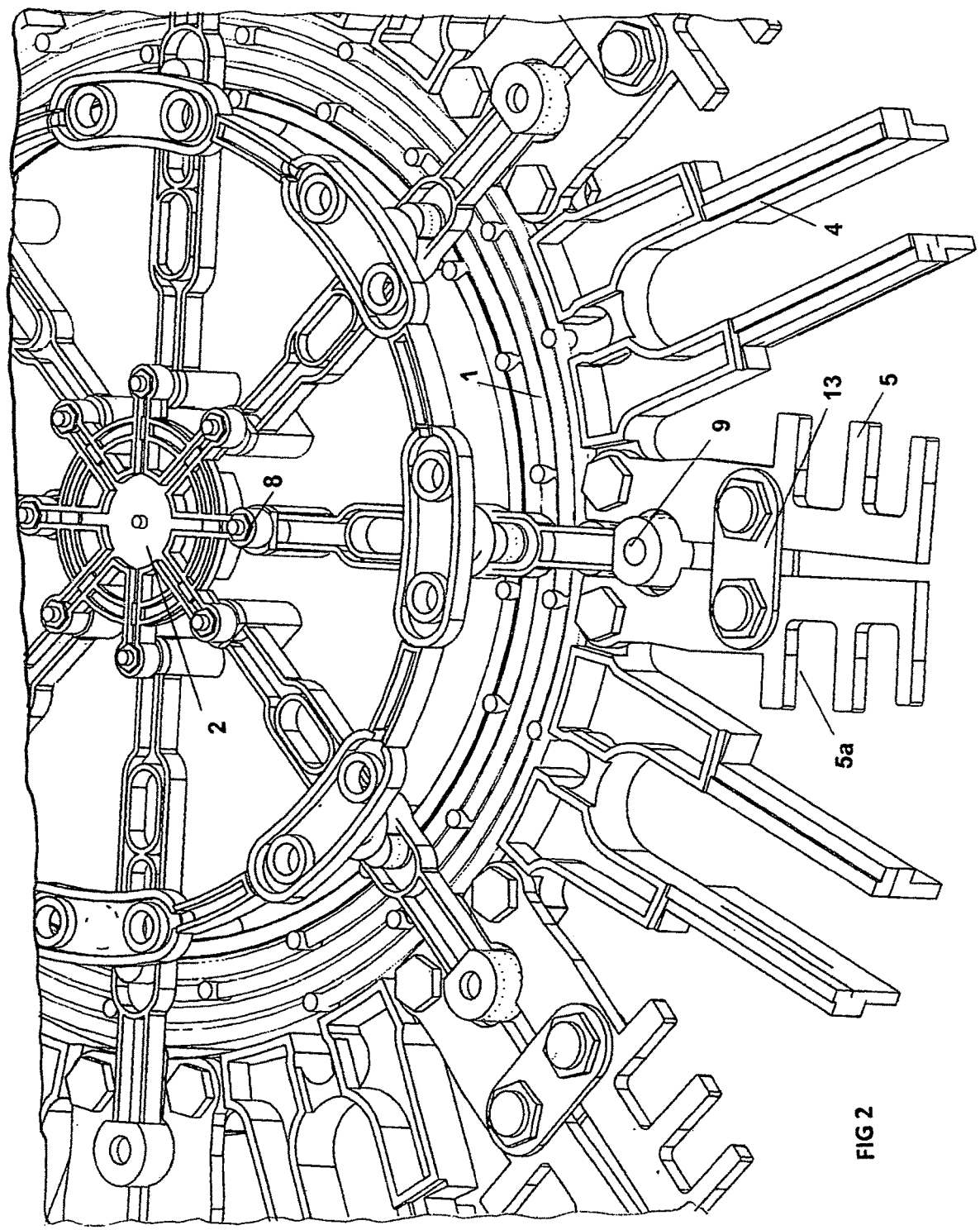
FIG. 2 is a partial view of Fishermen's Island with floating fishery water-filled ring tubes

FIG. 2 is a partial view of Fishermen's Island with floating fishery water-filled ring tubes. Each Island radial member contains deck-supporting pole 7 extending upwards above water level, which is holding a segment of a walk-over-water fishermen's deck 6 which is hanging above said water-filled ring-tube fishery 1. Each deck segment is connected to each other with deck connecting bridge 19, which allows walking-on-water all around the island, fishing over the ring-tube fishery.

Figure 3:
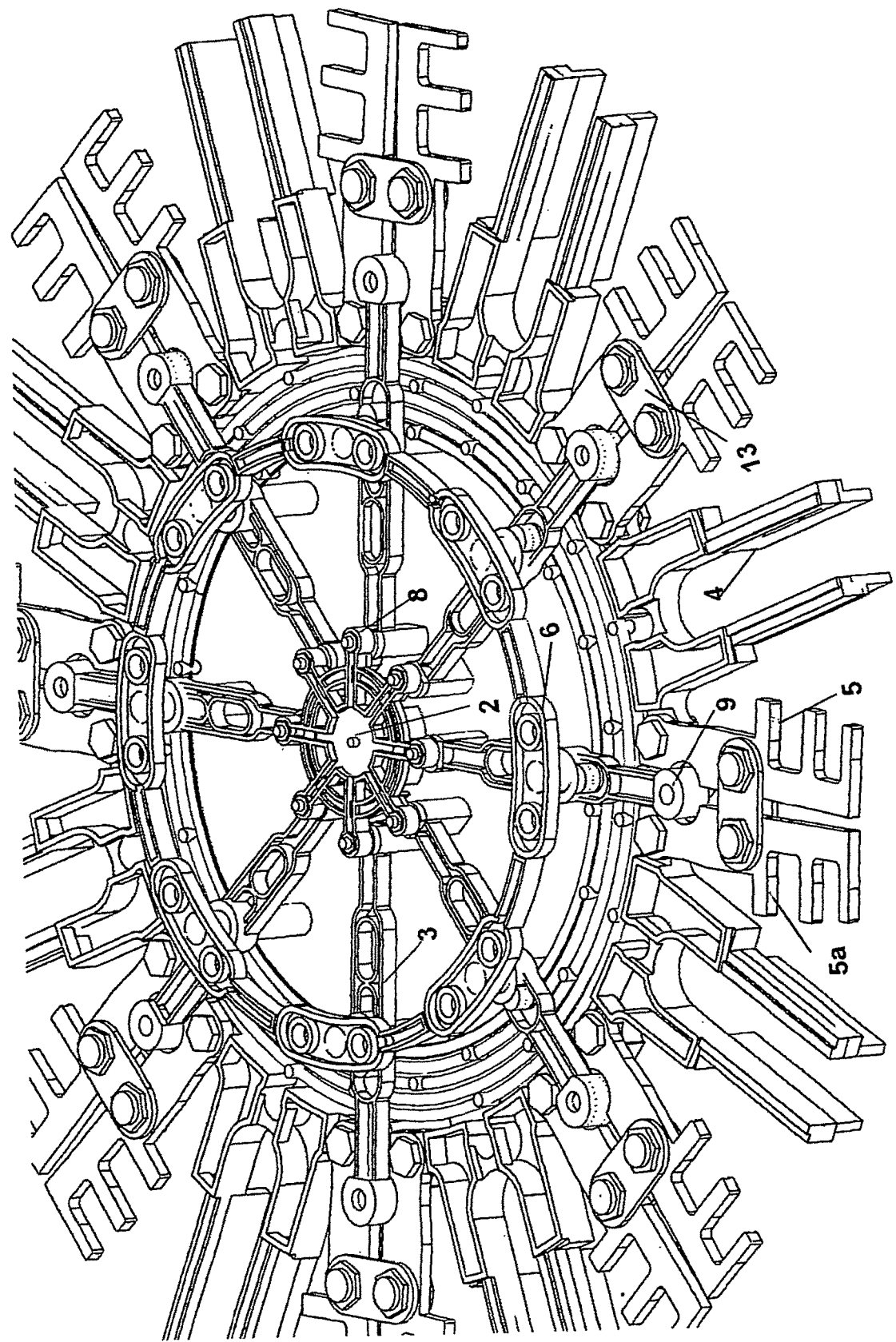
FIG. 3 presents a top view embodiment of Fishermen's Island with floating fishery water-filled ring tubes

FIG. 3 presents a top view embodiment of Fishermen's Island with floating fishery water-filled ring tubes. Each Island radial member contains vertical centering inner and outer centering adaptors 12 and 17 respectively located relative to said ring-tube fishery inner and outer diameters and extended deep in the water with cable connection end 12.

Figure 4:
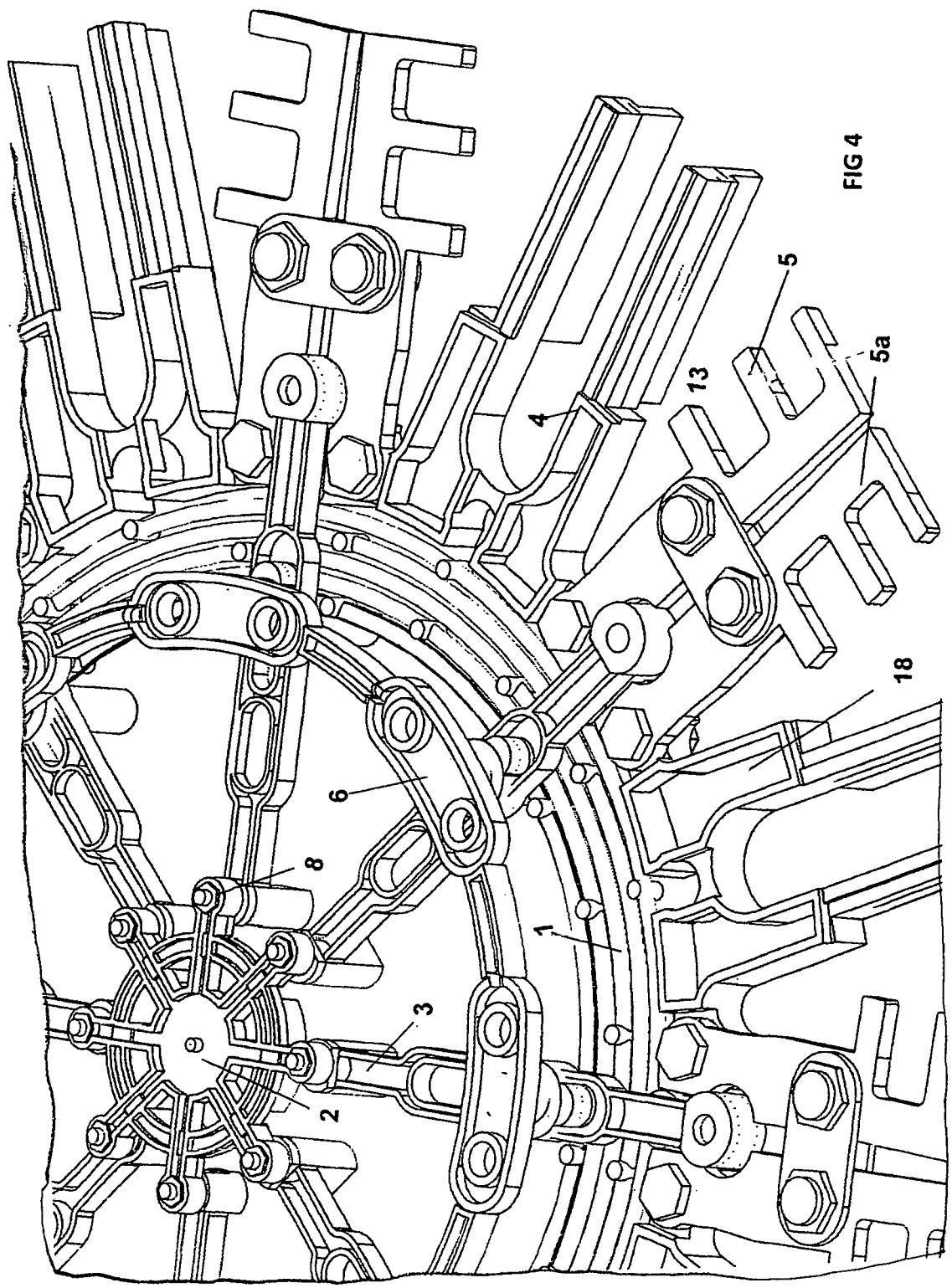
FIG. 4 is a detail partial view embodiment of Fishermen's Island with Island radial members connected to island boat docking reef

FIG. 4 is a detail partial view embodiment of Fishermen's Island with Island radial members connected to island boat docking reef. A flexible connecting cable connected to inner and outer cable connection ends 15 located underneath said ring-tube fishery 1. The connecting cable keeps the location of Island radial members relative to said ring-tube fishery 1.

Figure 5:
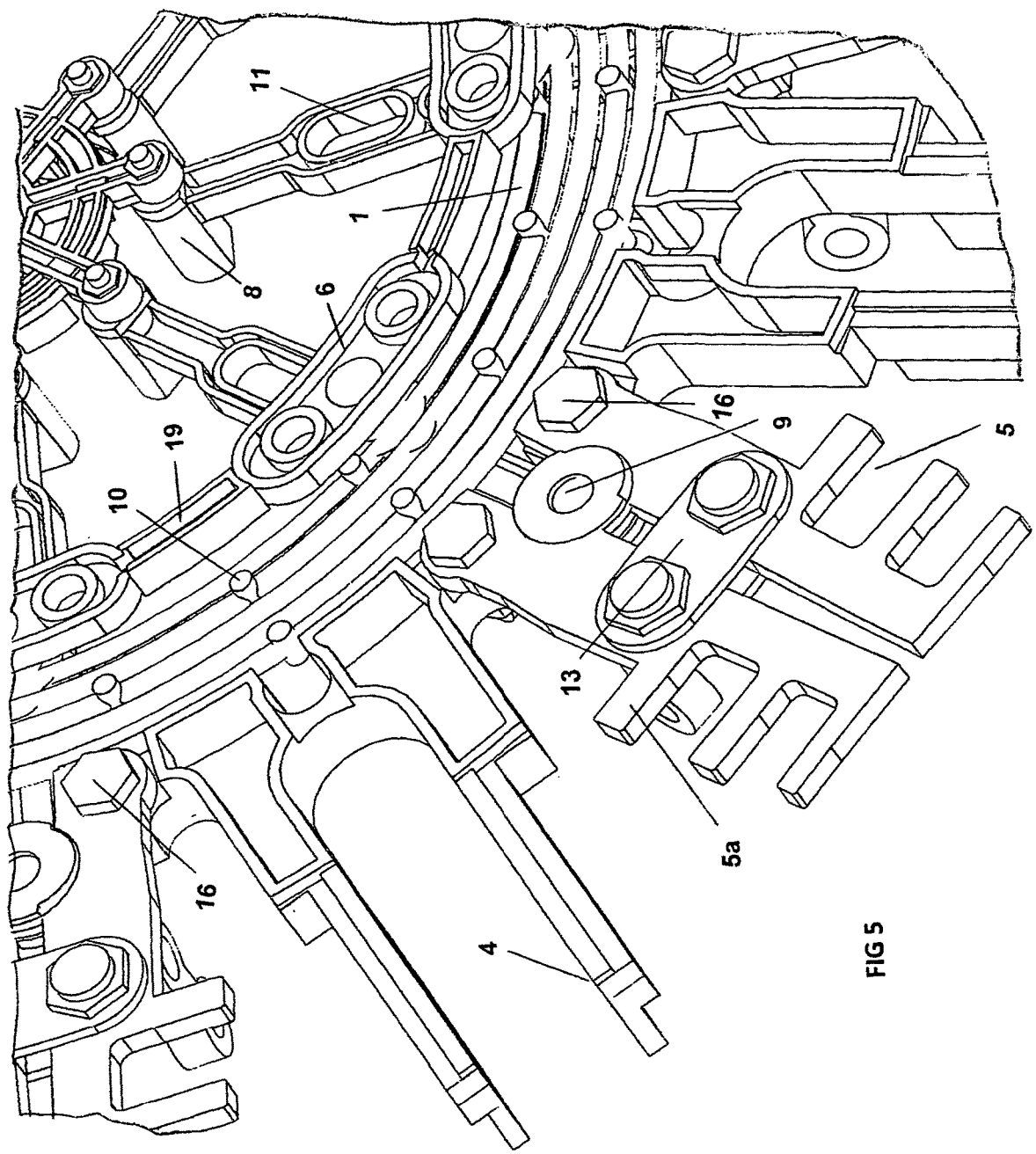
FIG. 5 is a preferred detail view embodiment of Fishermen's Island with Island radial members with walk on water fishing deck

FIG. 5 is a preferred detail view embodiment of Fishermen's Island with Island radial members with walk on water fishing deck. A connection cable 15 connected to island radial member extended from each cable connection end 10 into anchor attached to seabed whereas said island radial members 3 are located and secured to the seabed thus keeping said fishermen's Island from moving from its fixed location relative to seabed under rough sea conditions, keeping stability during storms.

Figure 6:
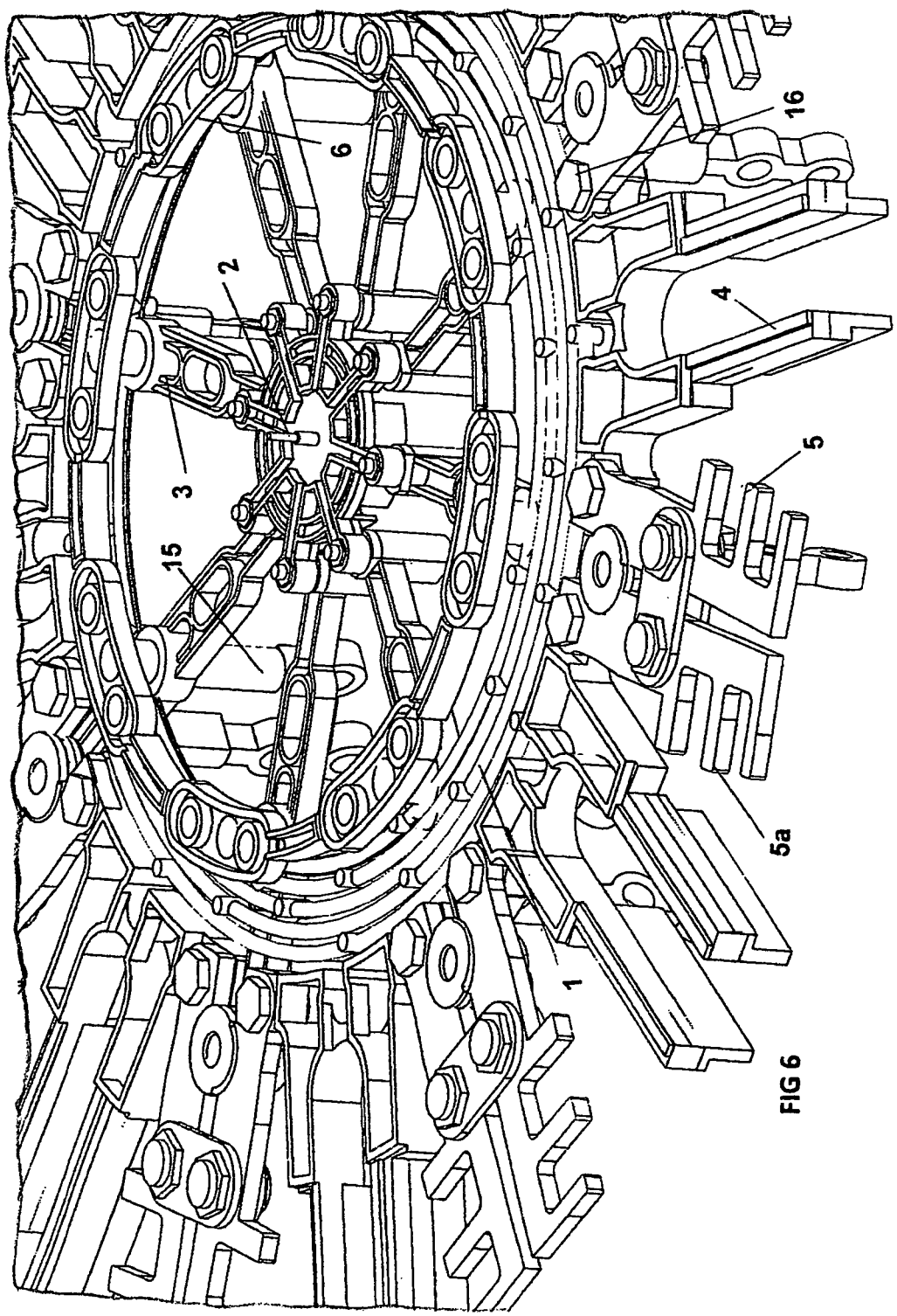
FIG. 6 is a preferred detail top view embodiment of Fishermen's Island with Island docking reef for service boats and for sailboats and motorboats.

FIG. 6 is a preferred detail top view embodiment of Fishermen's Island with Island docking reef for service boats and for sailboats and motorboats. Island center 2 consists of cylindrical main portion with eight radial segments for recreation, including, beaches, tennis court, water ski and other. Island center contains multiple radially equally spaced center arms with arm-end hole. Each arm hole accepts internally radial member end 8. A bolted hinge pin clamps each said radial member end to said Island center-arm end hole.

Figure 7:
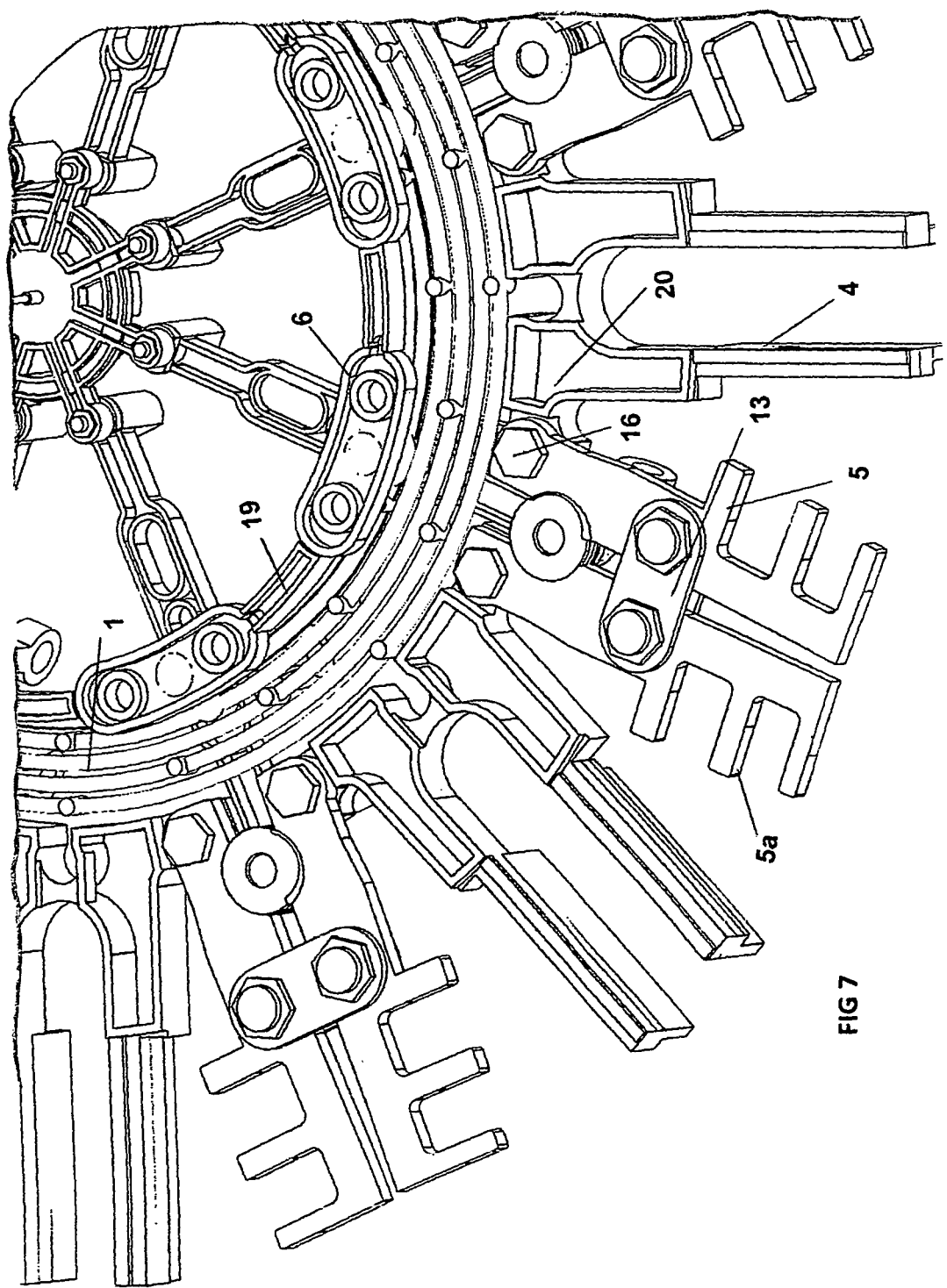
FIG. 7 is a preferred detail top view embodiment of Fishermen's Island with radial member connection to Island docking reef

FIG. 7 is a preferred detail top view embodiment of Fishermen's Island with radial member connection to Island docking reef. A 'walk over water' elevated deck 6 consists of eight radial sections with eight radial connection walking bridges 19 supported above said radial island member's pole 7 in said radial Island 3. The walking-over-water deck 6 is located above said water-filled ring-tube fishery 1 enabling fishing recreation activity for fishermen from fish pools underneath said walking deck 19.

Figure 8:
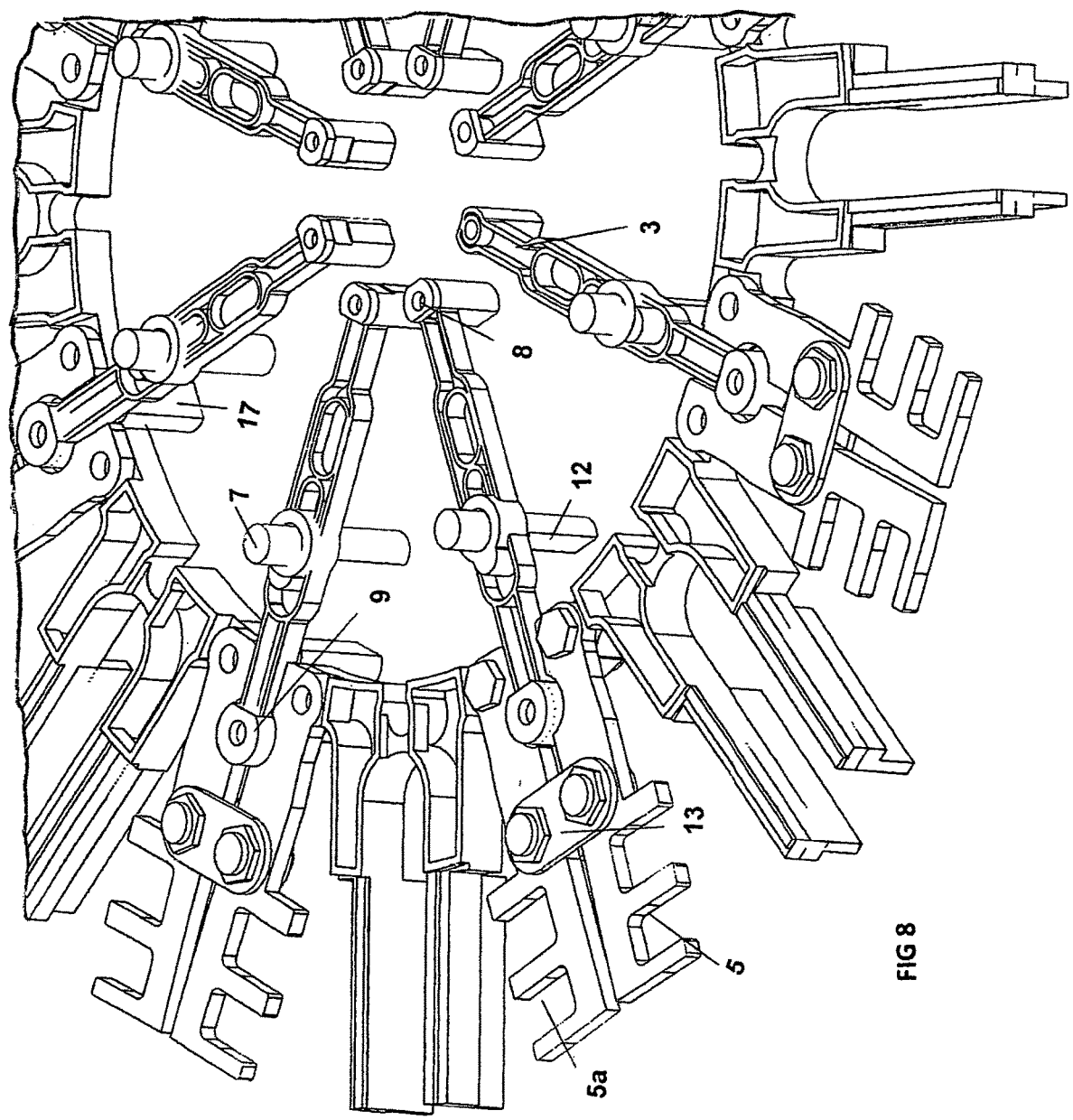
FIG. 8 is a preferred detail top view embodiment of Fishermen's Island in construction without ring tubes and island center

FIG. 8 is a preferred detail top view embodiment of Fishermen's Island in construction without ring tubes and island center. Eight external radial island docking segments 4 for large service boats and other boats comprising eight right-side radial island boat docking segments 5 with docking protrusion for multiple boat docking. Eight left-side radial island boat docking segments 5A with docking protrusion for multiple boat docking, each said right-side radial island boat docking segment 5 is connected to left side radial island boat docking segment 5a with plate 13 and two bolts.

Figure 9:
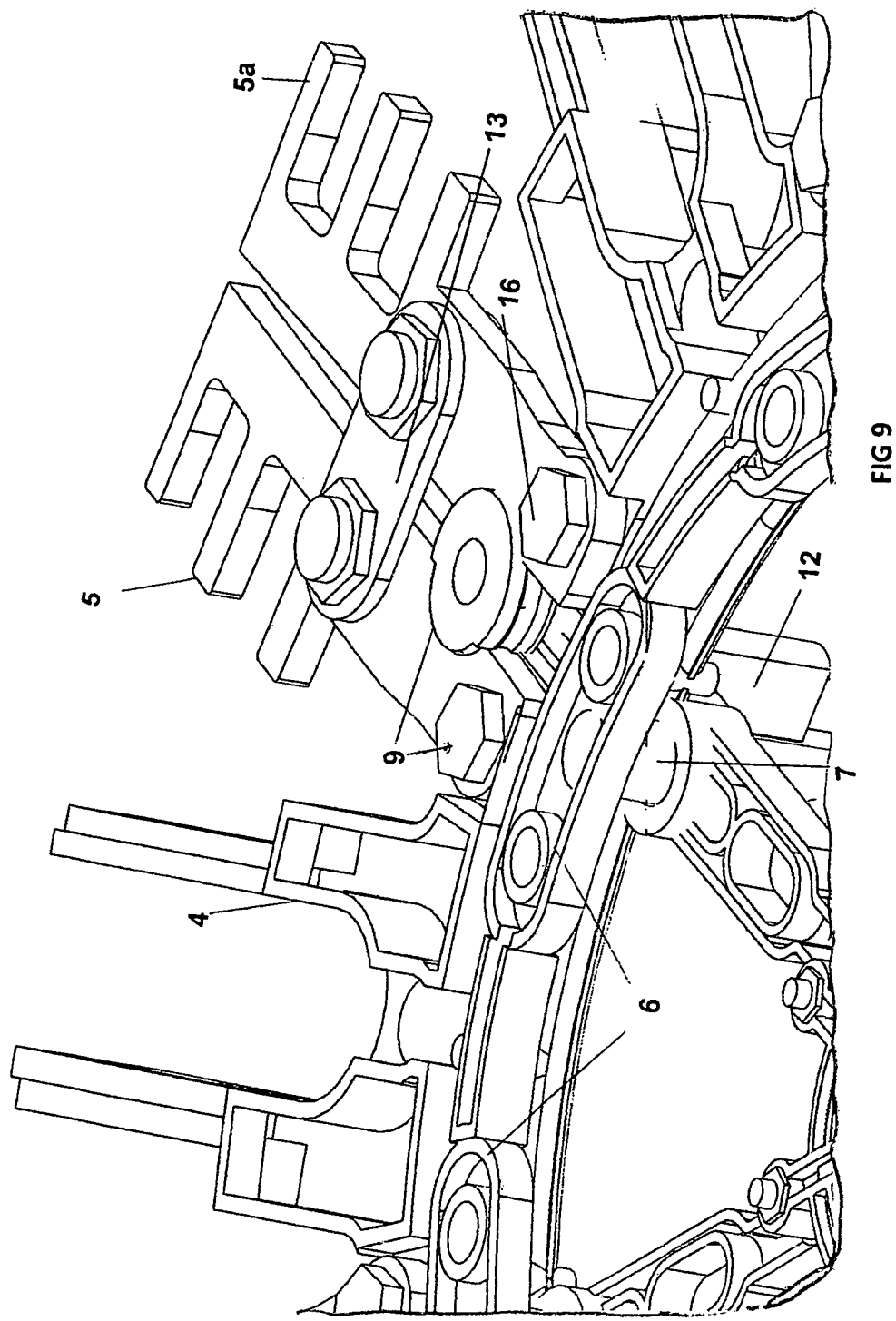
FIG. 9 is a detail top view embodiment of Fishermen's Island in construction without ring tubes and island center

FIG. 9 is a detail top view embodiment of Fishermen's Island in construction without ring tubes and island center. Each right-side island boat docking segment having a female extension with through hole 16 each left-side island boat docking segment having a male extension with through hole fitted into said female extension. Each female and male extensions connecting holes engaging with external radial member end 9 of said Island radial members 3 and secured with bolt through both.

FIG. 10 is a detail top view embodiment of Fishermen's Island center in construction without docking reef. Eight Island service boat docking segments 4 each accommodating large servicing boats for said ring-tube fishery 1 vertical connecting pipes 10. Each left side Island docking reef 5a is bolted to each right-end island docking reef right-side 16. Each Island service boat docking reef 4 connected with right and left island boat docking segments to create a continuous docking ring around ring-tube fishery of the Fishermen's Island.

The invention claimed is:

1. A fisherman's island for growing 10,000 tons of fish and seafood comprising:
   a. multiple water filled ring tube fishery, made of recycled plastic moldable and floatable compounds and a multiple island radial member array emerging from an island center and along equally spaced radii, and
   b. the ends of each said island radial members are pivoted and secured internally to said island center and externally to an island outer docking reef, whereas said Island radial members are emerging from said island center and spreading outwards towards said island outer docking reef, and
   c. each said island radial member comprises a vertical deck pole extending upwards above water level, supporting a plurality of walk-over-water fisherman's deck segments hanging above said water-filled ring-tube fishery, and
   d. each said island radial member comprises a vertical centering inner and a vertical centering outer adaptor located relative to said ring-tube fishery inner diameter and outer diameter respectively and extended deep in the water with a cable connection end, and
   e. a connecting cable attached to said inner and outer cable connection ends located underneath said ring-tube fishery whereas said connecting cable keeps the location of said island radial members relative to said ring-tube fishery
   f. said connection cable is extended from said outer cable connection end into an anchor attached to seabed whereas said island radial member is located and secured to the seabed thus keeping said fishermen's Island from moving from its fixed location under rough sea conditions, keeping stability during storms, and
   g. said island center consists of a cylindrical main portion with multiple radial sectors and with multiple radially centered arms with an arm-end hole, where each of said arm-end holes accepts the end of said island radial member, and
   h. a bolted hinge pin clamps the end of each said island radial member to said arm-end holes attached to said island center, and i. said walk-over-water fisherman's deck consists of multiple radial segments with multiple connection walking bridges, each supported by said vertical deck pole of each said island radial member, wherein said walking-over-water deck is located above said water-filled ring-tube fishery enabling recreational fishing activities for fishermen from a plurality of fish pools located underneath said walk-over-water deck, and j. a plurality of external island docking reefs for service boats and other boats, connected to each other and pivoted to the external end of said island radial member whereas said plurality of external island docking reefs connected together to create a docking-boat ring, comprising:

i. a plurality of right-side radial island boat docking reefs with docking reefs for multiple boats, each bolted to a left-side radial island boat docking reef with a bolted plate such that it creates docking reefs for multiple boats, and ii. each right-side island boat docking reef and each left-side island boat docking reef having an extension with a through hole, wherein each said right-side radial island boat docking reef and each said left-side radial island boat docking reef are connected together to the external end of said island radial member, and iii. a plurality of island service boat docking segments, the right side of said island boat docking segments is bolted to said left-side radial island boat docking reef, and the left side of said island boat docking segments is bolted to said right-side radial island boat docking reef wherein said island service boat docking segments are connected to said right-side radial island boat docking reefs and said left-side radial island boat docking reefs to create a continuous docking ring around said ring-tube fishery.

\* \* \* \* \*